United States Patent [19]
Kukkala et al.

[11] Patent Number: 5,859,111
[45] Date of Patent: Jan. 12, 1999

[54] PROCESSES FOR MAKING NONIONIC AQUEOUS POLYURETHANE DISPERSIONS

[75] Inventors: Pravin K. Kukkala, Raritan, N.J.;
Andrew J. Kielbania, Chalfont, Pa.;
Osamu Futakuchi, Osaka, Japan

[73] Assignee: National Starch and Chemical Investment Holding Corporation, Wilmington, Del.

[21] Appl. No.: 773,808

[22] Filed: Dec. 18, 1996

[51] Int. Cl.$^6$ .................................................. C08F 2/16
[52] U.S. Cl. .................... 524/458; 523/201; 523/402; 524/56; 524/268; 524/271; 524/457; 524/512; 524/460; 524/501; 524/502; 524/506; 524/507; 524/508; 524/510
[58] Field of Search ........................ 524/457, 507, 524/501, 458, 460, 502, 508, 271, 56, 506, 510, 512, 268; 523/201, 402

[56] References Cited

U.S. PATENT DOCUMENTS

| | | | |
|---|---|---|---|
| 3,920,598 | 11/1975 | Reiff et al. | 260/29.2 |
| 4,070,323 | 1/1978 | Vanderhoff et al. | 260/29.6 NR |
| 4,234,466 | 11/1980 | Takahashi et al. | 524/500 |
| 4,373,053 | 2/1983 | Sato et al. | 524/457 |
| 4,507,426 | 3/1985 | Blake, Jr. | 524/505 |
| 4,644,030 | 2/1987 | Loewrigkeit et al. | 524/457 |
| 4,730,021 | 3/1988 | Zom et al. | 524/457 |
| 4,927,876 | 5/1990 | Coogan et al. | 524/457 |
| 5,095,066 | 3/1992 | Meixner et al. | 524/500 |
| 5,104,928 | 4/1992 | Craun et al. | 524/773 |
| 5,116,901 | 5/1992 | Biale | 524/457 |
| 5,137,961 | 8/1992 | Goos et al. | 524/457 |
| 5,169,719 | 12/1992 | Balatan | 428/423.1 |
| 5,173,526 | 12/1992 | Vijayendran et al. | 524/457 |
| 5,306,765 | 4/1994 | Kuriyama et al. | 524/457 |
| 5,360,835 | 11/1994 | Sato et al. | 524/457 |
| 5,371,133 | 12/1994 | Stanley | 524/457 |
| 5,422,392 | 6/1995 | Floyd et al. | 524/457 |

OTHER PUBLICATIONS

D. Dieterich, "Aqueous Emulsions, Dispersions and Solutions of Polyurethanes; Synthesis and Properties", *Progress in Organic Coatings*, 9(1981) pp. 281–340.

J. W. Rosthauser and Klaus Nachtkamp, "Waterborne Polyurethanes", *Adv. Urethane Science and Technology*, 1987, pp. 121–162.

*Primary Examiner*—Judy M. Reddick
*Attorney, Agent, or Firm*—Jane E. Gennaro; Lydia T. McNally

[57] ABSTRACT

A process is described for preparing aqueous polymeric dispersions of a dispersion of an interpenetrated polymer of a hydrophobic polyurethane and a polymer prepared from ethylenically unsaturated monomers, and optionally a dispersion of another monomer that will enhance the performance of the interpenetrated polymer.

3 Claims, No Drawings

PROCESSES FOR MAKING NONIONIC AQUEOUS POLYURETHANE DISPERSIONS

FIELD OF THE INVENTION

This invention relates to a process for making aqueous dispersions containing a dispersion of an interpenetrated polymer prepared from a hydrophobic polyurethane and a polymer prepared from one or more ethylenically unsaturated monomers, and optionally, a dispersion of at least one additional polymer that will enhance the properties of the final dispersion. This invention further relates to the aqueous dispersions made by this process.

BACKGROUND OF THE INVENTION

Aqueous-based polyurethanes historically have not approached the performance of solvent-based polyurethanes. In attempts to overcome this deficiency, the chemical industry has formulated two-component dispersions intended to capture through the properties of the individual polymers more of the properties of the solvent-based dispersions.

One formulating technique for making two component dispersions consists in blending a dispersion of a polyurethane with a dispersion of a second polymer. If the polyurethane is hydrophobic it will be difficult to disperse; therefore, it is first dissolved in a water-miscible solvent, which acts as a dispersing aid. The polyurethane in solvent is then dispersed with water through a phase inversion utilizing high shear forces and surfactants. The problem with this method is that the solvent eventually must be distilled off, raising costs and environmental considerations. Moreover, when this polyurethane dispersion is blended with another polymeric dispersion, the blending itself is subject to chemical, thermodynamic and kinetic limitations. When more than two different polymeric species are formulated, the blending process becomes more difficult and complex, and can result in phase separation, large particle size, the use of high levels of dispersing aids, high viscosity and non-homogeneous dispersions or gelation/coagulation.

Another technique, which avoids the use of organic solvents and blending processes, consists of making a dispersion of an interpenetrated polymer of a polyurethane and a polymer formed by vinyl addition polymerization. A polyurethane prepolymer is dissolved in the monomers for the vinyl addition, and this mix is then dispersed with water. The resulting aqueous dispersion is subjected to vinyl-addition polymerization conditions to polymerize the monomer and form the interpenetrated polymer. This technique, however, relies on the use of a hydrophilic polyurethane. Polyurethanes can be made hydrophilic and self-dispersing by the incorporation into the polymer of ionic or amphoteric moieties, or of nonionic moieties derived from polyethylene glycol. The use of anionic or cationic moieties on the polyurethane causes pH instability. For anionic polyurethanes, the pH should be above 6.5, and for cationic polyurethanes, the pH should be below 7.5. Moreover, hydrophilic polyurethanes have reduced water and solvent resistance and are undesirable for some applications.

Thus, each of these methods has limitations. If the polyurethane is hydrophobic, accomplishing the dispersion requires the use of a water miscible organic solvent and surfactants to accomplish the dispersion. This, consequently, means the subsequent removal of the organic solvent. In the case where monomer is used as a reactive diluent and later polymerized to form the interpenetrated polymer, the art has taught that the polyurethane needs to be hydrophilic. When hydrophilic moieties are incorporated into the polymer, both solvent resistance and water resistance in the final product are inferior to those properties in solvent-borne polyurethanes.

These problems create a need for dispersions of hydrophobic polyurethanes, and particularly for interpenetrated polymers prepared from hydrophobic polyurethanes and polymers prepared from ethylenically unsaturated monomers. There also exists a need to provide dispersions having a broader range of performance properties than can be achieved by dispersions made from current processes, particularly through dispersions that can incorporate polymeric performance enhancers. These needs are met by the instant invention.

SUMMARY OF THE INVENTION

This invention is directed to a process for preparing aqueous polymeric dispersions comprising a dispersion of an interpenetrated polymer of a hydrophobic polyurethane and a polymer prepared from one or more ethylenically unsaturated monomers, and optionally, a dispersion of one or more additional polymers that are capable of imparting enhanced performance to the polymeric dispersion.

The hydrophobic polyurethanes of this invention are any polyurethanes that are not by themselves substantially soluble in water or that are not self-dispersing. (For example, self-dispersing polyurethanes would contain ionic or amphoteric moieties, or nonionic moieties based on poly(ethylene oxides)).

The polymer prepared from one or more ethylenically unsaturated monomers may be referred to herein as a vinyl-addition polymer, and the additional polymers giving enhanced performance may be referred to herein as polymeric performance enhancers or PPEs.

As used herein, an interpenetrated polymer shall mean a polymer prepared from two or more polymers that have no common covalent bonds, but that are physically interconnected.

Basically, the process for preparing the aqueous polymeric dispersions consists in the formation of a dispersion of the interpenetrated polymer. If the PPE is to be part of the aqueous polymeric dispersion, the formation of the interpenetrated polymer will take place in the presence of the PPE.

The process comprises the steps of providing a mixture of polyurethane prepolymer and one or more ethylenically unsaturated monomers, dispersing the mixture with water, optionally containing polyamines, in the presence of dispersing aids until a phase inversion occurs, and then polymerizing the ethylenically unsaturated monomer or monomers using conventional free-radical vinyl-addition polymerization techniques. The ethylenically unsaturated monomers may be substantially hydrophobic, and the polyamines preferably are diamines.

The polyurethane prepolymer is prepared from the reaction of one or more aromatic or aliphatic polyisocyanates with one or more organic compounds having at least two active hydrogen atoms, in a molar ratio effective to result in unreacted isocyanate functionality. The prepolymer may be prepared neat, and then dissolved in the ethylenically unsaturated monomers, or may be prepared directly within the ethylenically unsaturated monomers. Preferably, the monomers are not reactive with the monomer components for the polyurethane synthesis. During dispersal, the unreacted isocyanate functionality reacts with the water, or with the water and polyamines, to chain extend the prepolymer (build molecular weight) and form a fully reacted polyurethane. As will be understood, reaction with diamines will form urea linkages, and reaction with water will form urethane linkages.

Typical dispersing aids are those known and used in the art, such as colloids and surfactants.

If a PPE is to be present, the PPE will be dissolved in one or more ethylenically unsaturated monomers, that may be, but need not be, the same as used for the polyurethane prepolymer. The PPE dissolved in monomers may be used as the medium for the preparation of the polyurethane prepolymer, or if the prepolymer was prepared neat, may be added to the prepolymer before the dispersion with water. The PPE may also be added after the phase inversion and before or during the polymerization of the ethylenically unsaturated monomers (the vinyl-addition polymerization.) In any case, if a PPE is to be used, it is added to the prepolymer and ethylenically unsaturated monomers preferably before the vinyl-addition polymerization, although addition during the polymerization is also possible.

Additional ethylenically unsaturated monomers and dispersing aids may be added after the phase inversion and dispersion. These may be added before the start of the vinyl-addition polymerization, or may be added during the course of the polymerization. These monomers may be, but need not be, the same as those used in prior steps.

These steps result in a dispersion of an interpenetrated polymer of a hydrophobic polyurethane and the polymer of the vinyl-addition polymerization, and may, but need not, include one or more PPEs. The invention is also directed to aqueous compositions that contain the aqueous dispersions of the present invention and articles of manufacture prepared utilizing the aqueous compositions containing the aqueous polymeric dispersions.

DETAILED DESCRIPTION OF THE INVENTION

The initial step in the preparation of the dispersions of this invention is the preparation of the prepolymer to the hydrophobic polyurethane.

I. Preparation of Polyurethane Prepolymer Dispersion

The isocyanates and active hydrogen containing compounds are chosen so that the resultant polyurethane will be hydrophobic. In general, the final molecular ratio of isocyanate groups to active hydrogen atoms (including those from any chain extending compound) is between about (0.7–2.1) to 1, and preferably between about (0.9–1.8) to 1. The term "active hydrogen atom" refers to hydrogens that are reactive with isocyanate groups and that because of their position in the molecule display activity according to the Zerewitinoff test, J. Amer. Chem. Soc. 49, 3181 (1927); this includes hydrogens attached to oxygen, sulfur or nitrogen, as in the groups —OH, —SH, =NH, and $NH_2$.

Typically, the polymerization to create the prepolymer is carried out at temperatures in the range of 25°–120° C. for about 1–10 hours, and may be conducted with or without typical urethane reaction catalysts known in the art. Suitable catalysts include dibutyl tin dilaurate; the stannous salts of carboxylic acids having from 2 to 18 carbon atoms, such as, stannous laurate, stannous stearate, stannous acetate, stannous butyrate, stannous octoate and the like, and mixtures of those.

Other suitable catalysts include dibutyl tin dimaleate, tributyl tin oxide, dibutyl tin sulfide, iron acetyl acetonate, cobalt benzoate, tetra (2-ethyl hexyl) titanate, tetra butyl titanate, and the like. Many other compounds accelerate the reaction of a hydroxyl or other groups with an isocyanate in preference to certain other reactions of the isocyanate group, and any of these compounds may be used. Those skilled in the art will choose a specific catalyst to confer desired characteristics to individual urethane reactions.

In addition, any suitable tertiary amine may be used alone or with the metallic catalyst, for example, triethylene diamine, N-ethyl morpholine, N-methyl morpholine, or 4-dimethyl amino ethyl piperazine.

The hydrophobic polyurethane prepolymer may be prepared neat or may be prepared within one or more selected ethylenically unsaturated monomers capable of free-radical polymerization. If the prepolymer was prepared neat, it is then dissolved in the ethylenically unsaturated monomer. Unexpectedly, the unsaturated monomer may be one that is substantially insoluble in water, despite the fact that the monomer will subsequently be dispersed with water. This is unexpected because water-insoluble solvents perform very poorly as dispersion aids for hydrophobic polyurethanes. Indeed, the most widely used and well known process for polyurethane dispersions uses acetone and is known as the acetone process (D. Dieterich, "Aqueous Emulsions, Dispersions and Solutions of Polyurethanes; Synthesis and properties, *Progress in Organic Coatings,* 9 (1981) 281–340.)

If it is desired to have a PPE in the final composition, one or more PPEs may be added to the ethylenically unsaturated monomer at this point. The polyurethane prepolymer dissolved in the ethylenically unsaturated monomer, with or without the PPE, is then dispersed with water. Simultaneously with the dispersion, the molecular weight of the prepolymer may be built-up by chain extension with the water or with polyamines that have been added to the water phase. Suitable polyamines are those known and used in the art, and preferably are diamines.

The dispersion will take place in the presence of dispersing aids, which can be surfactants or emulsifying agents, or colloids, or both, and preferably are colloids. Suitable surfactant emulsifying agents can be anionic, cationic, nonionic surface-active compounds or mixtures of those compounds.

Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quaternary ammonium salts, and alkyl quaternary phosphonium salts. Examples of suitable nonionic emulsifiers are the addition products of 5 to 50 mols of ethylene oxide adducted to straight-chain and branch-chain alkanols with 6 to 22 carbon atoms, or alkylphenols, or higher fatty acids, or higher fatty acid amides, or primary and secondary higher alkyl amines, as well as block copolymers of propylene oxide with ethylene oxide and mixtures of those compounds.

When combinations of emulsifying agents are used, it is advantageous to use a relatively hydrophobic emulsifying agent in combination with a relatively hydrophilic agent. The amount of emulsifying agent is generally from about 1 to about 10, preferably from about 2 to about 8, weight percent of the monomers used in the polymerization.

Suitable colloids include partially acetylated polyvinyl alcohol, for example, up to 50 percent acetylated, casein, hydroxyethyl starch, carboxymethyl cellulose, gum arabic, and the like, as known in the art of synthetic emulsion polymer technology. In general, these colloids are used at levels of 0.05 to 4% by weight based on the total emulsion.

Depending upon the desired end use, the particular polyurethane and its molecular weight, the amount of polyurethane in the final dispersion may vary from about 5 to 75 percent by weight of the aqueous dispersion, preferably from 15 to 40 percent by weight.

If the selected polymeric performance enhancer was not present during the dispersion step, it is dissolved in an ethylenically unsaturated monomer that may be, but need not be, the same ethylenically unsaturated monomer used during preparation of the polyurethane. The unsaturated monomer containing the dissolved PPE is dispersed into the dispersion of the polyurethane and unsaturated monomer dispersion, or may be introduced during the vinyl-addition polymerization.

II. Polymerization of Ethylenically Unsaturated Monomers

The ethylenically unsaturated monomer or monomers are then polymerized using conventional batch or slow-add free-radical polymerization procedures in the presence of the fully reacted polyurethane and, if present, the PPE. Additional ethylenically-unsaturated monomers may be added during the polymerization.

Suitable polymerization initiators for the vinyl-addition polymerization are the water-soluble free-radical-formers generally used in emulsion polymerization, such as, hydrogen peroxide, sodium persulfate, potassium persulfate and ammonium persulfate, and tert-butyl hydroperoxide, in amounts from 0.01% to 3% by weight, preferably 0.01% to 1% by weight, based on the total dispersion solids. These initiators can be used alone or together with reducing agents, such as, sodium formaldehyde-sulfoxylate, ferrous salts, sodium dithionite, sodium hydrogen sulfite, sodium sulfite, sodium thiosulfate, ascorbic acid and isoascorbic acid, to perform as redox catalysts, which reducing agents will be present in amounts from 0.01% to 3% by weight, preferably 0.01% to 1% by weight, based on the total dispersion solids. The free-radical-formers can be charged to the polymerization in the aqueous solution or can be added during the polymerization in doses or slow-added.

The vinyl addition polymerization may be carried out at any convenient pH. Because the hydrophobic poliurethanes contain no anionic or cationic moieties, pH instability is not a concern. However, if a specific pH range is desired, it may be useful to work in the presence of customary buffer systems, for example, alkali metal acetates, alkali metal carbonates, or alkali metal phosphates. Polymerization regulators, like mercaptans, aldehydes, chloroform, ethylene chloride and trichloroethylene, may also be added in some cases. The polymerization reaction is generally continued until the residual-free monomer content is below 1% by weight of dispersion solids. The completed reaction product is then allowed to cool to room temperature while sealed from the atmosphere.

The final aqueous dispersion will contain in a total of 100 weight percent dry solids, from about 5 to about 75. weight percent of the polyurethane, from about 5 to about 75 weight percent of the polymer prepared from the ethylenically unsaturated monomer, and from about 0.5 to about 60 weight percent, preferably from about 2 to about 50 weight percent, and more preferably from about 5 to about 30 weight percent of the PPE, all weights being based on the total weight of solids of the polyurethane, the polymer of the ethylenically unsaturated monomer, and the PPE.

Generally, the final aqueous dispersion will contain from about 20 to about 65 weight percent solids, and preferably about 45 to 55 weight percent solids; particle sizes of 0.03 to 2 micron, preferably 0.04 to 1.0 micron; and more preferably from 0.04 to 0.5 micron; and a solution viscosity of 10 to 5000 mPas (cps), typically 10 to 500 mPas. The dispersion will contain less than 2 weight percent of grit (200 mesh screen), preferably less than 1 weight percent, and even more preferably less than 0.1 weight percent.

III. Polyisocyanates

The aromatic or aliphatic polyisocyanates used in the formation of the polyurethane prepolymer preferably are diisocyanates, and include, without limitation, such compounds as, methylene-diphenyl diisocyanate, methylene-bis (4-cyclohexyl-isocyanate), isophorone diisocyanate, toluene diisocyanate, 1,5-naphthalene diisocyanate, 4,4'-diphenyl-methane diisocyanate, 2,2'-dimethyl-4,4'-diphenyl-methane diisocyanate, 4,4'-dibenzyl-diisocyanate, 1,3-phenylene diisocyanate, 1,4-phenylene diisocyanate, mixtures of 2,4- and 2,6-toluene diisocyanate, 2,2'-dichloro-4,4'-diisocyanato diphenylmethane, 2,4-dibromo-1,5-diisocyanato naphthalene, butane-1,4-diisocyanate, hexane-1,6-diisocyanate, cyclohexane-1,4-diisocyanate, and m-tetramethyl-xylene diisocyanate.

Blocked isocyanates, which release free isocyanate groups at higher temperatures, are also useful and include, without limitation, dimeric-2,4-tolylene diisocyanate, and polyisocyanates that have had their isocyanate groups blocked with, for example, phenol, tert-butanol, phthalimide, caprolactam, and the like. Generally, the preferred blocked polyisocyanates are the diisocyanates; however, small amounts of triisocyanates and those of higher functionality may be used, provided their use does not cause gelling of the polymerization mixture.

IV. Active Hydrogen-Containing Compounds

In the formation of the polyurethane prepolymer, the organic compounds that have at least two hydrogen atoms reactive with isocyanate may be any that do not make the resulting polyurethane hydrophilic. In general, they will have a number average molecular weight of about 300 to 20,000, preferably about 400 to 5,000. They will be linear in order to prevent gelling during polymerization, but small amounts of non-linear compounds may be used provided their use does not cause gelling. Most commonly, these compounds will be polyhydroxy compounds, and will have a number average molecular weight of about 400 to 5,000, and an average —OH value of about 10 to about 1,000, preferably about 30 to about 150, as determined by ASTM E22267, Method B.

Suitable polyhydroxy compounds include, without limitation, compounds such as polyether diols or polyether/polyester diols, excepting those from polyethylene oxides; polyester diols, polyacetal diols, polyamide diols, polyester/polyamide diols, poly(alkylene ether)diols, polythioether diols, and polycarbonate diols. It is preferred to use difunctional compounds, although small amounts of tri-(and greater) functional compounds may be used.

Suitable polyether diols are, for example, the condensation products of propylene oxide, butylene oxide, or tetrahydrofuran with polyhydric alcohols, such as, ethylene glycol, 1,2-propylene glycol and 1,4-butanediol. Suitable polyethers are prepared by the condensation of the mentioned alkylene oxides and their copolymerization, graft or block polymerization products, such as, mixed ethylene oxide/ propylene oxide condensates, and the graft polymerization products of the reaction of olefins under high pressure with the mentioned alkylene oxide condensates.

Suitable polyester diols, polyester amide diols, and polyamide diols are preferably saturated, and are obtained, for example, from the reaction of saturated or unsaturated polycarboxylic acids with saturated or unsaturated polyhydric alcohols. Suitable carboxylic acids for preparing these compounds include, for example, adipic acid, succinic acid, phthalic acid, terephthalic acid, and maleic acid. Suitable polyhydric alcohols for preparing the polyester diols include, for example, ethylene glycol, 1,2-propylene glycol, 1,4-butanediol, neopentyl glycol, hexanediol, and trimethylolpropane. A suitable amino alcohol for preparing polyester amide diols is, for example, ethanolamine. Suitable diamines for preparing polyester amide diols and polyamide diols are, for example, ethylene diamine and hexamethylene diamine.

Suitable polyacetals can be prepared, for example, from 1,4-butanediol or hexanediol and formaldehyde. Suitable polythioether diols can be prepared, for example, by the condensation of thiodiglycol with ethylene oxide, propylene oxide, butylene oxide or tetrahydrofuran. Polyhydroxy compounds that already contain urethane groups, and natural polyols, which may be further modified, for example, castor oil and carbohydrates, may also be used.

V. Chain Extension Agents

In preparing the polyurethane polymer, it may be desirable to chain extend the polyurethane using an organic compound other than the water of dispersion. Such a chain extension compound will have a number average molecular weight preferably less than 500 and greater than 16. The active-hydrogen-containing chain extender will be suitably a polyol, an amino alcohol, a primary or a heterocyclic amine, especially a diamine.

Examples of the preferable chain extenders include hydrazine, ethylenediamine, diethylene triamine, triethylene tetramine, propylene diamine, butylene diamine, butylene diamine, hexamethylene diamine, cyclohexylene diamine, piperazine, 2-methyl piperazine, phenylene diamine, toluene diamine, tris(2-aminoethyl)amine, 4,4'-methylenebis(2-chloroaniline), 3,3'-dichloro-4,4'-diphenyl diamine, 2,6-diaminopyridine, 4,4'-diaminophenyl methane, isophorone diamine.

If it is desired not to chain extend the polymer, the reaction to form the polyurethane can be quenched by the addition of a mono alcohol, secondary amine, or ammonia to consume any residual isocyanate functionality. A preferred and suitable quenching compound is ethanol.

VI. Ethylenically Unsaturated Monomer

Ethylenically unsaturated monomers are used in two distinct steps in the process: 1) they are used as the reactive diluent for the polyurethane prepolymer for the phase inversion/water is dispersion step; and 2) they optionally are added after the phase inversion/dispersion and before or during the vinyl polymerization. In either case, they will be capable of free-radical polymerization.

If the monomer is being used as the reactive diluent for the prepolymer for the phase inversion/dispersion, it usually has been chosen to be water soluble in order to assure easy dispersion with water. This has been the case because the art has taught that solvents used as dispersion aids for hydrophobic polyurethanes should be water soluble. It has now been unexpectedly discovered that hydrophobic monomers, or substantially water insoluble monomers, perform well as dispersion aids, and these preferably are used when water and chemical resistant properties are needed in the final product.

Examples of ethylenically unsaturated hydrophobic monomers include, without limitation:
vinyl esters of alkanoic acids having from 1 to about 18 carbon atoms, such as vinyl formate, vinyl acetate, vinyl propionate, vinyl butyrate, vinyl isobutyrate, vinyl valerate, vinyl 2-ethylhexanoate, vinyl isooctanoate, vinyl nonoate, vinyl decanoate, vinyl pivalate, vinyl versatates, vinyl laurate, and vinyl stearate;

alpha-olefins, such as ethylene, propylene, butylene, isobutylene and pentene and the like;

$C_1$–$C_{18}$ alkyl esters of acrylic acid, such as methyl, ethyl, n-butyl, isobutyl, sec-butyl, the various isomeric pentyl, hexyl, heptyl, and octyl (especially 2-ethylhexyl), lauryl, cetyl, stearyl and the like acrylates;

$C_1$–$C_{18}$ alkyl esters of methacrylic acid, such as methyl, ethyl, propyl, n-butyl, isobutyl, r-hexyl, 2-ethylhexyl, n-octyl, lauryl, cetyl, stearyl and the like methacrylates;

vinyl alkyl ethers, having an alkyl group with 1 to 18 carbon atoms, such as methyl vinyl ester, ethyl vinyl ether, butyl vinyl ether and stearyl vinyl ether;

diene monomers, such as butadiene, chloroprene, and isoprene and similar compounds;

aromatic vinyl monomers, such as styrene, α-methylstyrene, vinyl toluene, 2-bromostyrene, and p-chlorostyrene;

vinyl halide monomers, such as vinyl chloride and vinylidene chloride; benzyl acrylate and t-butyl acrylate;

vinyl esters of aromatic acids, such as vinyl benzoate;

Preferred hydrophobic ethylenically unsaturated monomers include (meth)acrylates, glycidol(meth)acrylates, vinyl esters, olefins, and acrylonitrile.

Examples of hydrophilic ethylenically unsaturated monomers include without limitation:
α,β-ethylenically unsaturated mono- and dicarboxylic acids such as acrylic acid, methacrylic acid, maleic acid, and itaconic acid;

maleate, fumarate, and itaconate esters of $C_1$–$C_8$ alcohols, such as dibutyl maleate, dibutyl fumarate, dibutyl itaconate;

amides of α,β-ethylenically unsaturated acids, such as acrylamide, methacrylamide, N-methyloylacrylamide, maleic acid amide and maleic acid imide, including substituted amides of unsaturated carboxylic acids, such as methylol acrylamide and methylol methacrylamide;

nitriles of α,β-ethylenically unsaturated carboxylic acids, such as acrylonitrile and methacrylonitrile;

heterocyclic vinyl monomers, such as vinyl pyridine and vinyl pyrrolidone; also glycidylmethacrylate and glycidylacrylate;

hydroxyalkyl esters of acrylic and methacrylic acids, such as hydroxyethyl(meth)acrylate and hydroxypropyl (meth)acrylates, and glycerolmono(meth)acrylate.

Preferred hydrophilic ethylenically unsaturated monomers include hydroxyalkyl(meth)acrylates, (meth)acrylic acids, monoalkylmaleates, dialkylmaleates, N-methylolmethacrylate, N-vinyl formamide and N-vinyl pyrrolidone.

In addition, crosslinking and crosslinkable monomers can be used, for example, divinyl benzene, diallyl phthalate, and triallyl cyanurate. Other polymerizable compounds, such as surfactants, for example, sodium vinyl sulfonate may also be used.

VII. Polymeric Performance Enhancer

The polymeric performance enhancer (PPE) will be chosen to enhance one or more properties of the aqueous dispersion and of any aqueous composition containing the dispersion. It is selected for its capability to provide a particular property, for example, tensile and bond strength, or chemical or water resistance. In some cases, the PPE itself can act as a stabilizer or colloid for the preparation of the dispersion. Preferably it will be soluble in one of the ethylenically unsaturated monomers chosen to form the interpenetrated polymer, but it is not soluble in water and is not dispersible in water without the aid or use of stabilizer. The PPE is non-reactive with both the polyurethane and the ethylenically unsaturated monomer during the preparation of the dispersion. Consequently, after the vinyl addition polymerization, the aqueous dispersion may contain at least three discrete polymeric components, and all three components are physically interlinked to form an interpenetrated polymer. The PPE may be either thermoplastic or thermoset and, while it is non-reactive with the polyurethane and ethylenically unsaturated monomer during the preparation of the dispersion, it may be curable or reactive subsequent to the polymerization of the ethylenically unsaturated monomer.

The PPE may be prepared by addition polymerization techniques, defined by IUPAC as polymerization by a repeated addition process, i.e., monomer units are added so that the resulting chain is the sum of all the atoms in the monomers. Representative addition polymers useful as PPEs include, without limitation, synthetic and natural hydrocarbon resins, such as petroleum-based products and waxes, polyethylene, polyisobutylene, ethylene/acrylic acid copolymers, polyacrylonitrile, polyvinyl chloride, polystyrene, poly(meth)acrylates, polyvinyl acetate, polyvinylidene chloride, polybutadiene, polyacrylonitrile/butadiene/styrene terpolymer, vinyl/acrylic copolymer, styrene/(meth)acrylate copolymers, polychloroprene, polyisoprene, styrene/butadiene copolymers, ethylene/vinyl acetate copolymers, styrene/isoprene copolymers, styrene/maleic anhydride copolymers, acrylonitrile/(meth)acrylate copolymers, polyvinylpyrrolidone, polyvinylacetate/N-vinyl formamide copolymers, polyvinyl ethers and ethylene/vinylchloride copolymers.

In addition, suitable PPE polymers include naturally occurring polymers, such as rosin acids, rosin esters and terpene phenolics, or may be prepared from the rosin acids, rosin esters and phenolic esters via condensation polymerization. Natural rubbers, epoxidized-rubbers and other functionalized rubbers may be used as PPEs.

The PPEs also may be prepared by condensation polymerization techniques, defined by IUPAC as polymerization by a repeated condensation process, i.e., with elimination of simple molecules. Representative condensation polymers useful as PPEs include, without limitation, polyesters, amino resins, epoxy resins, furan polymers, polyacetals, poly(alkylene sulfide)s, polyamides, polyamines, polyaminotriazoles, polyanhydrides, polycarbonates, polyhydrazines, polyimides, polyquinoxalines, polysaccharides, polysulfides, polyureas, proteins, silicones, phenol formaldehyde, urea formaldehyde and melamine formaldehyde, and polyurethanes that do not contain functional groups that would render the polyurethane PPEs soluble in water. Such functional groups include, for example, carboxylic acid, sulfonic acid or phosphoric acid groups and quaternary nitrogen.

Preferred PPEs include hydrocarbon resins, ethylene/acrylic acid copolymers, polyacrylonitrile, polyvinyl chloride, polystyrene, poly(meth)acrylates, polyvinyl acetate, polyvinylidene chloride, polybutadiene, polyacrylonitrile/butadiene/styrene terpolymer, vinyl/acrylic copolymer, styrene/(meth)acrylate copolymers, polychloroprene, polyisoprene, styrene/butadiene copolymers, ethylene/vinyl acetate copolymers, styrene/isoprene copolymers, styrene/maleic anhydride copolymers, acrylonitrile/(meth)acrylate copolymers, polyvinylpyrrolidone, polyvinylacetate/N-vinyl formamide copolymers, polyvinyl ethers, ethylene/vinylchloride copolymers, rosin acids, rosin esters, terpene phenolics, polyesters, amino resins, epoxy resins, polyacetals, polyamides, polyamines, polyanhydrides, polycarbonates, polyimides, polysaccharides, polysulfides, polyureas, silicones, polyurethanes, phenol formaldehyde, urea formaldehyde and melamine formaldehyde.

More preferred PPEs include polyesters, polyamides, ethylene/acrylic acid copolymers, epoxy resins, polyamines, styrene/butadiene copolymers, acrylonitrile/butadiene/styrene terpolymers, styrene/maleic anhydride copolymers, styrene/isoprene copolymers, polyvinylidene chloride, polysaccharides, polycarbonates, natural rubbers, epoxidized-rubbers and other functionalized rubbers.

Most preferred PPEs include polyacrylonitrile, polyvinyl chloride, polystyrene, poly(meth)acrylates, polyvinyl acetate, polybutadiene, polyacrylonitrile/butadiene/styrene terpolymer, vinyl/acrylic copolymer, styrene/(meth)acrylate copolymers, polychloroprene, polyisoprene, styrene/butadiene copolymers, ethylene/vinyl acetate copolymers, styrene/maleic anhydride copolymers, polyvinylpyrrolidone, polyvinylacetate/N-vinyl formamide copolymers, ethylene/vinylchloride copolymers, rosin acids, rosin esters, terpene phenolics, polyesters, amino resins, epoxy resins, polyamides, polyamines, polyanhydrides, polysaccharides, polyureas, phenol formaldehyde, urea formaldehyde, melamine formaldehyde, natural rubbers, epoxidized-rubbers and other functionalized rubbers.

VIII. Selection of Dispersion Components for Specific End-Uses

The components of these polymeric dispersions may be selected to produce specifically desired properties, and the dispersions may be used as is, or they may be formulated with other ingredients to prepare formulated aqueous compositions. When used as or in adhesive compositions, the adhesives can be any known in the art, such as, flexible laminating adhesives, pressure sensitive or non-pressure sensitive adhesives, contact adhesives, structural adhesives, or conductive adhesives. The components will then be selected to give improved adhesion, tensile strength, flexibility, and tack.

Additionally, the components may be selected to optimize adhesion, strength and clarity where the aqueous polymeric dispersions are utilized as glass-fiber sizes, for example, in fiber-reinforced plastic composites.

The components also may be selected to improve water, chemical and heat resistance and tensile strengths when the aqueous dispersions are used as or in saturants or binders in the manufacture of non-woven articles, such as disposable diapers, tissue, paper products other than tissue, vertical blinds, glass mats and fiberglass insulation.

The components may be selected to impart the properties of high gloss, high hardness, and chemical resistance to aqueous dispersions for use as or in sealants for application to wood substrates, leather substrates and synthetic equivalents, cementitious substrates, and other such porous substrates.

The components may be selected such that the aqueous polymeric dispersions may be used as or in other aqueous coating compositions where adhesion to synthetic and/or natural non-porous substrates, such as metal, plastics, polyester, polyolefin, and polyamide substrates, is required.

The components also may be selected to produce both rigid and flexible foams.

As will be understood, the choice of the components will be dependent not only on the anticipated end use, but also on their relative solubility with each other.

IX. Industrial Utility

The dispersions of the present invention may be used to form adhesives, laminates, roof mastics, flocking adhesives, fabric book coatings, inks, pigments for printing, paints, foams, binders for nonwovens (for example, pulp, polyester, polyolefin), sizes for fibers (for example, glass), and primers for substrates to be coated or painted. The dispersions may be formulated with auxiliary agents such as crosslinkers, rheology modifiers, coalescent agents, pigments, plasticizers and other additives that are conventionally used depending on the particular end-use application. One skilled in the art, once having the benefit of this disclosure, will be able to ascertain readily which auxiliary agents are appropriate for the selected application.

EXAMPLES

The following examples are working examples that serve to illustrate the present invention. All parts, percentages and proportions referred to herein and in the claims are by weight unless otherwise indicated.

EXAMPLE 1

This example illustrates the preparation of dispersions of interpenetrated polymers of a polyurethane and an acrylic or vinyl monomer, and optionally, an epoxy as the PPE. In these dispersions, the urethane prepolymer was prepared neat from 1,4-butanediol adipate and isophorone diisocyanate. The prepolymer was then dissolved in an acrylic or vinyl monomer in the presence of a hydrophobic ethylene oxide/propylene oxide block copolymer, which functions as a colloid stabilizer. For some of the dispersions, a PPE was present. The urethane prepolymer and the acrylic or vinyl monomer (in some samples with the PPE) were then dispersed with water until phase inversion occurred. The water contained piperazine hexahydrate to chain extend the prepolymer and form the polyurethane. The reagents and the procedure for making the dispersions are given here.

| Reagents for PU dispersion Ex. 1 | Parts by weight |
| --- | --- |
| 1,4-butanediol adipate | 200 |
| isophorone diisocyanate | 88.8 |
| colloid | 28.9 |
| EO/PO block copolymer Pluronic F108 | |
| acrylic or vinyl monomer | 115 to 145 |
| PPE monomer, | 14.4 |
| bisphenol A epoxy | |
| distilled water- 1st charge | 130 to 175 |

-continued

| Reagents for PU dispersion Ex. 1 | Parts by weight |
| --- | --- |
| distilled water- $2^{nd}$, $3^{rd}$, $4^{th}$ charges | 3 to 4 X's 45 |
| piperazine hexahydrate | 34.96 |
| in distilled water | 214.5 |

Notes:
Pluronic ® F108 is a product of BASF.
Bisphenol A epoxy is a product of Shell Chemical Company.

Stirring for this procedure was accomplished with a Heidolph #2101 stirrer at 1000 rpm.

The 1,4-butanediol adipate was charged into the reaction vessel and held with stirring between 80°–85° C. for 15 minutes while purging the vessel with $N_2$. Stirring was discontinued, and the isophorone diisocyanate was then charged into the reactor. Stirring was resumed, and after the initial exotherm abated the temperature was held at 80°–85° C. for a total reaction time of 3 hours.

The surfactant, the acrylic or vinyl monomer, and, if present, the PPE, which in these dispersions was a bisphenol A epoxy, were charged into the reactor and the mixture stirred for 30 minutes until it was homogeneous. The resultant prepolymer was then cooled down to about 35° C.

The first charge of distilled water for the phase inversion was added with stirring for 10 minutes. Subsequent charges were added with stirring following each addition until the resulting emulsion was homogeneous. The piperazine in distilled water was then added to chain extend the polymer, and stirring was continued for one hour.

The polyurethane dispersion (200 g by dry weight) was then subjected to a vinyl-addition polymerization. The reagents and procedure for the polymerization are given here.

| Reagents for Polymerization Ex. 1 | Parts by weight |
| --- | --- |
| polyurethane dispersion | 200 |
| ammonium persulfate | 0.12 |
| in distilled water | 3 |
| sodium metabisulfite | 0.12 |
| distilled water | 3 |
| if present, additional vinyl or acrylic monomers | ~55 |
| ammonium persulfate | 0.3 |
| in distilled water | 40 |
| sodium metabisulfite | 0.3 |
| in distilled water | 40 |

A 200 g sample of the polyurethane dispersion was heated to 65° C. while being strongly purged with $N_2$. The ammonium persulfate in water, followed by the sodium metabisulfite in water, were added and the dispersion stirred for 10 minutes, after which it was heated to 75° C. gradually with stirring, and held at 75°–80° C. for four hours.

For those samples which additional acrylic or vinyl monomers were added during the vinyl-addition polymerization, after the temperature reached 75° C., the additional monomers were added slowly over a period of two to three hours, followed by the slow addition of the 0.3 parts sodium persulfate in 40 parts distilled water and 0.3 parts sodium metabisulfite in 40 parts distilled water over an additional two and one half hours.

The resulting interpenetrated polymer dispersions were then cooled and discharged.

The following table lists the composition of interpenetrated polymers made according to the above procedure. The parts by weight of the surfactants, vinyl or acrylic monomer, any additional vinyl or acrylic monomers that may have been added during the vinyl-addition polymerization, and any epoxy that may have been added during the initial dispersion, are based on 100 parts by dry weight of the polyurethane prepolymer. The meanings of the symbols used in the table are given in the notes following the table.

TABLE 1

COMPOSITION OF DISPERSIONS IN PARTS BY WEIGHT

| PU Prepolymer 100 parts by wt | Acrylic or Vinyl Monomer | PPE | Surfactant F108/X305 | Additional Monomers |
|---|---|---|---|---|
| Ex 1-A | MMA 40 | — | 10/0 | — |
| Ex 1-B | MMA 40 | — | 10/5 | — |
| Ex 1-C | Vac 50 | — | 15/0 | MA/MMA/BA 72/14/14 |
| Ex 1-D | MA 40 | — | 10/5 | — |
| Ex 1-E | MA 40 | — | 10/5 | MA/MMA/BA 72/14/14 |
| Ex 1-F | MA 42 | Epoxy 5 | 11/5 | MA/MMA 72/28 |
| Ex 1-G | MA 42 | Epoxy 5 | 11/5 | MA/MMA/BA 72/14/14 |

Notes on Table 1:
MMA   methyl methacrylate
MA    methyl acrylate
VAc   vinyl acetate
Epoxy Epon 828, bisphenol A, a product of Shell Chemical Company
BA    butyl acrylate
F108  Pluronic F108, colloid, a product of BASF.
X305  Triton ® X305, surfactant, a product of Union Carbide.

For Example 1-A, the percent solids was measured at the beginning of the vinyl polymerization and at the end to test the effectiveness of the polymerization. The percent solids increased from an initial level of 34.8% to 42.8% by weight, an indication that the vinyl addition polymerization was is successful.

All of the above examples showed good stability with no settling of particles during three months of storage at ambient temperature.

EXAMPLE 2

In this example the polyurethane prepolymer was prepared from isophorone diisocyanate and polypropylene glycol (MW 1000). Dispersions of interpenetrated polymers were prepared according to the procedures given below. The reagents for the initial dispersion and for the vinyl addition polymerization follow.

| Reagents for dispersion Ex. 2 | Parts by weight |
|---|---|
| polypropylene glycol 1000 | 200 |
| isophorone diisocyanate | 88.8 |
| dibutyl tin dilaurate (catalyst) | 0.2 (3 drops) |
| EPON 828 epoxy | 14.4 |
| colloid EO/PO block copolymer F108 | 30.3 |
| methyl acrylate | 60.6 |
| surfactant Triton X-305 | 21.66 |
| in distilled water | 236.6 |
| distilled water- 6 charges | 6 × 34.96 |
| piperazine hexahydrate | 34.96 |
| in distilled water | 200 |

Note:
identity and source of the reagents are as designated in the previous tables.

The polypropylene glycol was charged into the reaction vessel and heated to 80°–85° C. with stirring and while purging with $N_2$. Then the isophorone diisocyanate and dibutyl tin dilaurate were charged, and after the initial exothermic reaction the reaction mixture was stirred as the temperature was maintained at 80°–85° C. for 3 hours.

At the end of this time, the epoxy, the colloid EO/PO block copolymer, and the methyl acrylate were added and stirring was continued for 30 minutes until the mixture became homogeneous. The resultant prepolymer was cooled down to 35°–40° C.

The surfactant Triton X-305 was dissolved in distilled water and this solution added to the prepolymer with stirring using an axial blade at 400 rpm for 10 minutes. An additional 6 charges of water were added with stirring, after the second of these the stirring speed being increased to 1000 rpm. Stirring was continued after each charge until the dispersion became homogeneous.

The piperazine hexahydrate in distilled water was added and stirring continued for another hour to give a homogeneous dispersion.

This dispersion was then subjected to a vinyl-addition polymerization, during which additional monomers were added. The reagents for the polymerization are given here.

| Reagents for Polymerization Ex. 2 | Parts by weight |
|---|---|
| polyurethane dispersion 2 | 200 |
| ammonium persulfate | 0.12 |
| in distilled water | 3 |
| sodium metabisulfite | 0.12 |
| in distilled water | 3 |
| additional monomers | 47–54 |
| t-BHP | 0.3 |
| in distilled water | 10 |
| SFS | 0.3 |
| in distilled water | 10 |

Notes on Table:
t-BHP = t-butyl hydroperoxide
SFS = sodium formaldehyde sulfoxolate A 200 g sample of the dispersion was subjected to a vinyl-addition polymerization according to the same procedure as used in Example 1, except that after the addition of the sodium metabisulfite was completed, the t-BHP and SFS were added over a 15 minute period. The interpenetrated polymer dispersions were then cooled down and discharged.

Table 2 lists the composition of interpenetrated polymers made according to the above procedure. The parts by weight of the surfactants, vinyl or acrylic monomer, any additional vinyl or acrylic monomers that may have been added during the vinyl-addition polymerization, and any epoxy that may have been added during the initial dispersion, are based on 100 parts by dry weight of the polyurethane prepolymer. The meanings of the symbols used in the table are given in the notes following the table.

TABLE 2

COMPOSITION OF DISPERSIONS IN PARTS BY WEIGHT

| PU Prepolymer 100 parts by wt | Acrylic or Vinyl Monomer | PPE | Surfactant F108/X305 | Additional Monomers |
|---|---|---|---|---|
| Ex2-A | MA 20 | — | 10/5 | — |
| Ex 2-B | MA 20 | — | 10/5 | MA/MMA/BA 64/24/12 |
| Ex 2-C | MA | Epoxy | 11/5 | MA/MMA |

TABLE 2-continued

COMPOSITION OF DISPERSIONS IN PARTS BY WEIGHT

| PU Prepolymer 100 parts by wt | Acrylic or Vinyl Monomer | PPE | Surfactant F108/X305 | Additional Monomers |
|---|---|---|---|---|
| | 21 | 5 | | 76/24 |

Note:
identity and source of components are as designated in previous tables.

All of the above examples showed good stability with no settling of particles during three months of storage at ambient temperature.

EXAMPLE 3

In order to compare dispersibility, samples of hydrophilic and hydrophobic polyurethanes were prepared in solvents (other than the monomers and PPEs used in Examples 1 and 2) and each dispersed in water under shear in order to phase invert and form dispersions.

The hydrophobic polyurethane prepolymers for each were prepared from isophorone diisocyanate and 1,4-butanediol adipate in the same proportions as in Example 1, and dispersed according to the procedure of Example 1, with the exception that no vinyl or acrylic monomers or PPEs were present. The solvents used were toluene, a hydrophobic solvent, and methylethyl ketone (MEK) and acetone, hydrophilic solvents.

The hydrophilic polyurethane prepolymers were prepared from polypropylene glycol (PPG 1025, Union Carbide) and polyethylene glycol (PEG 335, Union Carbide) in a proportion (3.8::1) to make the polyurethane hydrophilic, and from isophorone diisocyanate. The procedure was the same as for Example 1, with the exception that no vinyl or acrylic monomers or PPEs were present.

Table 3 sets out the solvent used for the preparation of the prepolymer (which solvent is present during the phase inversion in the formation of the dispersion), the type of mixer used, the revolutions per minute (rpm) and the blade used in mixing, and the solids, viscosity, and particle size (in nanometers) of the resulting dispersion.

Referring to dispersions (PUD) 3-G and 3-H, hydrophilic polyurethanes can be seen to be easily dispersible, and they remained stable.

Referring to Dispersions 3-A to 3-C, the data show that an acceptable (fair) dispersion is obtained using a hydrophobic polyurethane only when very high shear is applied (5000 and 3000 rpm compared to 2000 rpm). The data for Dispersions 3-D to 3-F show that even with the use of hydrophilic solvents, hydrophobic polyurethanes are not easily dispersible if high shear forces are not used.

Therefore, it was entirely unexpected that the hydrophobic polyurethanes of Examples 1 and 2, when dissolved in a hydrophobic or substantially water-insoluble monomer, whether the vinyl or acrylic monomer or the PPE, would form stable interpenetrated polymers.

EXAMPLE 4

The change in average particle size of the hydrophobic prepolymer dispersion 1-D of Example 1 was followed during a vinyl-addition polymerization conducted according to Example 1. The particle size of the dispersion of 1-D remained constant in the range of 500 nm over the two and one-half hours time period of the vinyl-addition polymerization. This indicates that indeed an interpenetrated polymer was formed. If the vinyl-addition polymerization resulted in vinyl-addition particles distinct from the polyurethane particles, a bimodal distribution of particle sizes, larger for the polyurethane and smaller for the vinyl-addition polymers, would have been obtained.

As can be seen from the previous example, the particle size ranges for polyurethanes formed in solvents are commonly greater than 800 nm. Particle sizes for the polyurethane dispersions of the inventive examples are in the more desirable range of 400–500 nm. As is understood, the smaller the particle size, the more stable the dispersion. It was an unexpected advantage that the polyurethane dispersions would have a smaller particle size formed in monomer than in solvent.

What is claimed is:

1. A process for the preparation of an aqueous dispersion consisting of a dispersion of an interpenetrated polymer formed from a nonionic hydrophobic polyurethane and a polymer resulting from the polymerization of one or more hydrophobic ethylenically unsaturated monomers, and a

TABLE 3

PARAMETERS FOR DISPERSIONS

| PUD | 3-A h'phobic | 3-B h'phobic | 3-C h'phobic | 3-D h'phobic | 3-E h'phobic | 3-F h'phobic | 3-G h'philic | 3-H h'philic |
|---|---|---|---|---|---|---|---|---|
| solvent | toluene | toluene | toluene | MEK | MEK | acetone | none | toluene and X305 |
| mixer | homogen | air mixer | Heidolph | Heidolph | Heidolph | Heidolph | Heidolph | Heidolph |
| rpm | 3000 | 5000 | 2000 | 2000 | 1000 | 2000 | 400–1000 | 1000 |
| blade | — | Cowles | axial | axial | axial | axial | axial | axial |
| % solids | 36.1 | 35.8 | 35.0 | 35.2 | 35.2 | 35.8 | 31.6 | 32.9 |
| visc. Mpa.s | 96 | 92 | 62 | 88 | 86 | 38 | 332 | |
| p.s. nm | 975 | 875 | 1130 | 645 | 1243 | 7129 | | 3000 |
| stability at 3 mos. | fair | fair | poor | poor | poor | good | good | good |

Notes on Table 3:
X305 is surfactant Triton X305, a product of Union Carbide.
Stability evaluated with regard to the tendency of the dispersion to exhibit water separation and particle settling out affer three months storage at ambient temperatures. The less stable the dispersion, the more it exhibited the water separation and particle settling out.

dispersion of a polymeric performance enhancer, comprising the steps of:

a. providing a hydrophobic polyurethane prepolymer dissolved in one or more hydrophobic ethylenically unsaturated monomers; and b. dispersing the dissolved prepolymer and the one or more hydrophobic ethylenically unsaturated monomers with water and a dispersing aid, optionally in the presence of one or more chain extension agents;

c. subjecting the dispersion to emulsion polymerization conditions effective to polymerize the ethylenically unsaturated monomers, optionally while adding additional ethylenically unsaturated monomers during the polymerization, wherein the additional ethylenically unsaturated monomers may be hydrophobic or hydrophilic and wherein the polymeric performance enhancer is selected from the group consisting of synthetic and natural hydrocarbon resins, polyethylene, polyisobutylene, polyacrylonitrile, polyvinyl chloride, polystyrene, poly(meth)acrylates, polyvinyl acetate, polyvinylidene chloride, polybutadiene, polyacrylonitrile/butadiene/styrene terpolymer, vinyl/acrylic copolymer, styrene/(meth)acrylate copolymers, polychloroprene, polyisoprene, styrene/butadiene copolymers, ethylene/vinyl acetate copolymers, styrene/isoprene copolymers, acrylonitrile/(meth)acrylate copolymers, polyvinyl ethers, ethylene/vinylchloride copolymers, rosin acids, rosin esters, terpene phenolics, natural rubbers, epoxidized-rubbers, other functionalized rubbers, polyesters, amino resins, epoxy resins, furan polymers, polyacetals, poly(alkylene sulfide)s, polyamides, polyaminotriazoles, polycarbonates, polyhydrazines, polyimides, polyquinoxalines, polysaccharides, polysulfides, polyureas, silicones, phenol formaldehyde, urea formaldehyde and melamine formaldehyde, wherein the polymeric performance enhancer is present during the polymerization of the ethylenically unsaturated monomers.

2. A process for the preparation of an aqueous dispersion consisting of a dispersion of a interpenetrated polymer formed from a nonionic hydrophobic polyurethane and a polymer resulting from the polymerization of one or more hydrophobic ethylenically unsaturated monomers, and a dispersion of a polymeric performance enhancer, comprising the steps of:

a. providing a hydrophobic polyurethane prepolymer dissolved in one or more hydrophobic ethylenically unsaturated monomers; and b. dispersing the dissolved prepolymer and the one or more hydrophobic ethylenically unsaturated monomers with water and a dispersing aid, optionally in the presence of one or more chain extension agents;

c. subjecting the dispersion to emulsion polymerization conditions effective to polymerize the ethylenically unsaturated monomers, optionally while adding additional ethylenically unsaturated monomers during the polymerization, wherein the additional ethylenically unsaturated monomers may be hydrophobic or hydrophilic and wherein the polymeric performance enhancer is selected from the group consisting of synthetic and natural hydrocarbon resins, polyethylene, polyisobutylene, polyacrylonitrile, polyvinyl chloride, polystyrene, poly(meth)acrylates, polyvinyl acetate, polyvinylidene chloride, polybutadiene, polyacrylonitrile/butadiene/styrene terpolymer, vinyl/acrylic copolymer, styrene/(meth)acrylate copolymers, polychloroprene, polyisoprene, styrene/butadiene copolymers, ethylene/vinyl acetate copolymers, styrene/isoprene copolymers, acrylonitrile/(meth)acrylate copolymers, polyvinyl ethers, ethylene/vinylchloride copolymers, rosin acids, rosin esters, terpene phenolics, natural rubbers, epoxidized-rubbers, other functionalized rubbers, polyesters, amino resins, epoxy resins, furan polymers, polyacetals, poly(alkylene sulfide)s, polyamides, polyaminotriazoles, polycarbonates, polyhydrazines, polyimides, polyquinoxalines, polysaccharides, polysulfides, polyureas, silicones, phenol formaldehyde, urea formaldehyde and melamine formaldehyde, wherein the polymeric performance enhancer is dissolved with the hydrophobic polyurethane prepolymer in one or more hydrophobic ethylenically unsaturated monomers in step a.

3. A process for the preparation of an aqueous dispersion consisting of a dispersion of an interpenetrated polymer formed from a nonionic hydrophobic polyurethane and a polymer resulting from the polymerization of one or more hydrophobic ethylenically unsaturated monomers, and a dispersion of a polymeric performance enhancer, comprising the steps of:

a. providing a hydrophobic polyurethane prepolymer dissolved in one or more hydrophobic ethylenically unsaturated monomers; and b. dispersing the dissolved prepolymer and the one or more hydrophobic ethylenically unsaturated monomers with water and a dispersing aid, optionally in the presence of one or more chain extension agents;

c. subjecting the dispersion to emulsion polymerization conditions effective to polymerize the ethylenically unsaturated monomers, optionally while adding additional ethylenically unsaturated monomers during the polymerization, wherein the additional ethylenically unsaturated monomers may be hydrophobic or hydrophilic and wherein the polymeric performance enhancer is selected from the group consisting of synthetic and natural hydrocarbon resins, polyethylene, polyisobutylene, polyacrylonitrile, polyvinyl chloride, polystyrene, poly(meth)acrylates, polyvinyl acetate, polyvinylidene chloride, polybutadiene, polyacrylonitrile/butadiene/styrene terpolymer, vinyl/acrylic copolymer, styrene/(meth)acrylate copolymers, polychloroprene, polyisoprene, styrene/butadiene copolymers, ethylene/vinyl acetate copolymers, styrene/isoprene copolymers, acrylonitrile/(meth)acrylate copolymers, polyvinyl ethers, ethylene/vinylchloride copolymers, rosin acids, rosin esters, terpene phenolics, natural rubbers, epoxidized-rubbers, other functionalized rubbers, polyesters, amino resins, epoxy resins, furan polymers, polyacetals, poly(alkylene sulfide)s, polyamides, polyaminotriazoles, polycarbonates, polyhydrazines, polyimides, polyquinoxalines, polysaccharides, polysulfides, polyureas, silicones, phenol formaldehyde, urea formaldehyde and melamine formaldehyde, wherein the polymeric performance enhancer is added with the additional ethylenically unsaturated monomers during the polymerization of step c.

* * * * *